(12) United States Patent
Berger et al.

(10) Patent No.: US 12,531,890 B2
(45) Date of Patent: *Jan. 20, 2026

(54) REAL-TIME CYBERSECURITY STATUS SYSTEM WITH EVENT TICKER

(71) Applicant: Cytellix Corporation, Aliso Viejo, CA (US)

(72) Inventors: Brian Douglas Berger, Mission Viejo, CA (US); Howard Chen Lin, Mission Viejo, CA (US); Andrew Michael Fabrizio, Irvine, CA (US)

(73) Assignee: Cytellix Corporation, Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,889

(22) Filed: Feb. 9, 2024

(65) Prior Publication Data

US 2025/0016189 A1  Jan. 9, 2025

Related U.S. Application Data

(63) Continuation of application No. 17/654,026, filed on Mar. 8, 2022, now Pat. No. 11,902,316, which is a continuation of application No. 16/268,357, filed on Feb. 5, 2019, now Pat. No. 11,283,824.

(51) Int. Cl.
*H04L 43/045* (2022.01)
*H04L 9/40* (2022.01)

(52) U.S. Cl.
CPC ........ *H04L 63/1433* (2013.01); *H04L 43/045* (2013.01); *H04L 63/1416* (2013.01)

(58) Field of Classification Search
CPC .............. H04L 63/1433; H04L 43/045; H04L 63/1416
See application file for complete search history.

(56) References Cited

U.S. PATENT DOCUMENTS

| | | |
|---|---|---|
| 6,553,378 B1 | 4/2003 | Eschelbeck |
| 8,683,584 B1 | 3/2014 | Daswani et al. |
| 9,100,426 B1 | 8/2015 | Fang |
| 2012/0180133 A1 | 7/2012 | Al-Harbi et al. |
| 2017/0171231 A1* | 6/2017 | Reybok, Jr. ......... H04L 63/1433 |
| 2017/0262633 A1 | 9/2017 | Miserendino et al. |
| 2018/0026996 A1 | 1/2018 | Park et al. |
| 2018/0124072 A1* | 5/2018 | Hamdi ................. G06F 21/577 |
| 2018/0167414 A1 | 6/2018 | O'Reilly |
| 2018/0181423 A1* | 6/2018 | Gunda .................... G06F 21/57 |

(Continued)

*Primary Examiner* — Minh Chau Nguyen
(74) *Attorney, Agent, or Firm* — Knobbe, Martens, Olson & Bear, LLP

(57) ABSTRACT

A cybersecurity assessment system is provided for monitoring, assessing, and addressing the cybersecurity status of a target network. The cybersecurity assessment system can analyze the scan data and determine a degree to which the current status of the target network satisfies a particular cybersecurity readiness standard, and how the status changes over time. The cybersecurity assessment system can also transform large amounts of vulnerability scan data into efficient representations for use in providing interactive presentations of the vulnerabilities detected on the target network. The cybersecurity assessment system can also provide information regarding cybersecurity events in substantially real time.

20 Claims, 11 Drawing Sheets

(56) References Cited

U.S. PATENT DOCUMENTS

| | | |
|---|---|---|
| 2018/0219919 A1 | 8/2018 | Crabtree et al. |
| 2018/0241767 A1 | 8/2018 | Crabtree et al. |
| 2018/0295154 A1 | 10/2018 | Crabtree et al. |
| 2019/0068650 A1 | 2/2019 | Castel |
| 2019/0190955 A1 | 6/2019 | Khan et al. |
| 2019/0207968 A1 | 7/2019 | Heckman et al. |
| 2019/0222597 A1 | 7/2019 | Crabtree et al. |
| 2020/0082081 A1* | 3/2020 | Sarin .................... H04W 12/08 |
| 2020/0120126 A1 | 4/2020 | Ocepek et al. |
| 2020/0162499 A1* | 5/2020 | Alsharif ................ G06F 21/577 |
| 2020/0285742 A1* | 9/2020 | Sawas .................... G06F 21/64 |
| 2021/0084057 A1 | 3/2021 | Chhabra |

\* cited by examiner

REAL-TIME CYBERSECURITY STATUS SYSTEM WITH EVENT TICKER

CROSS-REFERENCE TO RELATED APPLICATION

This application is a continuation of U.S. patent application Ser. No. 17/654,026, filed Mar. 8, 2022, which is a continuation of U.S. patent application Ser. No. 16/268,357, filed Feb. 5, 2019, the contents of each of which are incorporated by reference herein and made part of this specification.

BACKGROUND

Computing devices may communicate with each other over a communication network, such as a local area network ("LAN"), wide area network ("WAN"), the internet, or some combination thereof. For example, a computing device may execute one or more applications that interact with other devices via a network, or that interact with data received from network-accessible data stores. During operation, the computing device may use various communication protocols to send data addressed to various communication ports of destination devices, and receive data via various communication ports.

Communication with other devices over a communication network can expose a computing device to certain risks. For example, vulnerabilities may be introduced by bugs or design flaws in the software and/or hardware that make up a computing device. As another example, vulnerabilities may be introduced by the manner in which a computing device and/or network is configured and used. These and other vulnerabilities can expose a computing device to harmful or malicious activity originating from another device with access to the communication network. Once such vulnerabilities are discovered, various preventive and remedial steps can be taken to mitigate the risks. For example, software fixes ("patches") can be applied, new hardware can be used, and/or new operating procedures can be implemented.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. One aspect includes systems, methods, and/or non-transitory computer-readable media that provide features for real-time cybersecurity status assessment. The features include generating a plurality of data streams based at least partly on scanning a target network, wherein a first data stream of the plurality of data streams comprises data representing characteristics of devices on the target network, wherein a second data stream of the plurality of data streams comprises data representing events detected on the target network, and wherein a third data stream of the plurality of data streams comprises data representing vulnerabilities associated with devices on the target network; generating processed scan data based at least partly on the plurality of data streams; identifying a cybersecurity assessment framework against which the target network is to be assessed; determining an initial score for one or more cybersecurity factors associated with the cybersecurity assessment framework; determining an adjustment for one or more of the determined initial scores based at least partly on the processed scan data, wherein a first adjustment to a first initial score is determined by applying a set of rules, associated with a first cybersecurity factor, to a subset of the processed scan data; generating an overall cybersecurity score based at least partly on applying the determined adjustments to the determined initial scores; and presenting a visual representation of the overall cybersecurity score. Another aspect includes systems, methods, and/or non-transitory computer-readable media that provide features for a cloud-based cybersecurity portal with vulnerability management. The features include generating a vulnerability data file by scanning a target network and identifying a plurality of cybersecurity vulnerabilities, wherein each vulnerability is represented in the vulnerability data file by at least a vulnerability identifier and a severity label, and wherein the severity label comprises one of: a critical severity label, a high severity label, or a medium severity label; generating a critical severity file comprising a plurality of vulnerability identifiers associated with the critical severity label; generating a high severity file comprising a plurality of vulnerability identifiers associated with the high severity label; generating a medium severity file comprising a plurality of vulnerability identifiers associated with the medium severity label; determining a first set of unique vulnerability identifiers in vulnerability data file; generating a map file comprising the set of unique vulnerability identifiers, wherein each unique vulnerability identifier is associated with a key-value pair; generating a summary file comprising data representing a first quantity of vulnerabilities in the vulnerability data file associated with the critical severity label, a second quantity of vulnerabilities in the vulnerability data file associated with the high severity label, and a third quantity of vulnerabilities in the vulnerability data file associated with the medium severity label; generating a user interface configured to display a first graph based at least partly on the summary file, wherein the first graph comprises selectable segments for each of the critical severity file, the high severity file, and the medium severity file; receiving a selection of a selectable segment; and updating the user interface to display a second graph based at least partly on a severity file associated with the selectable segment.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Figure 1:
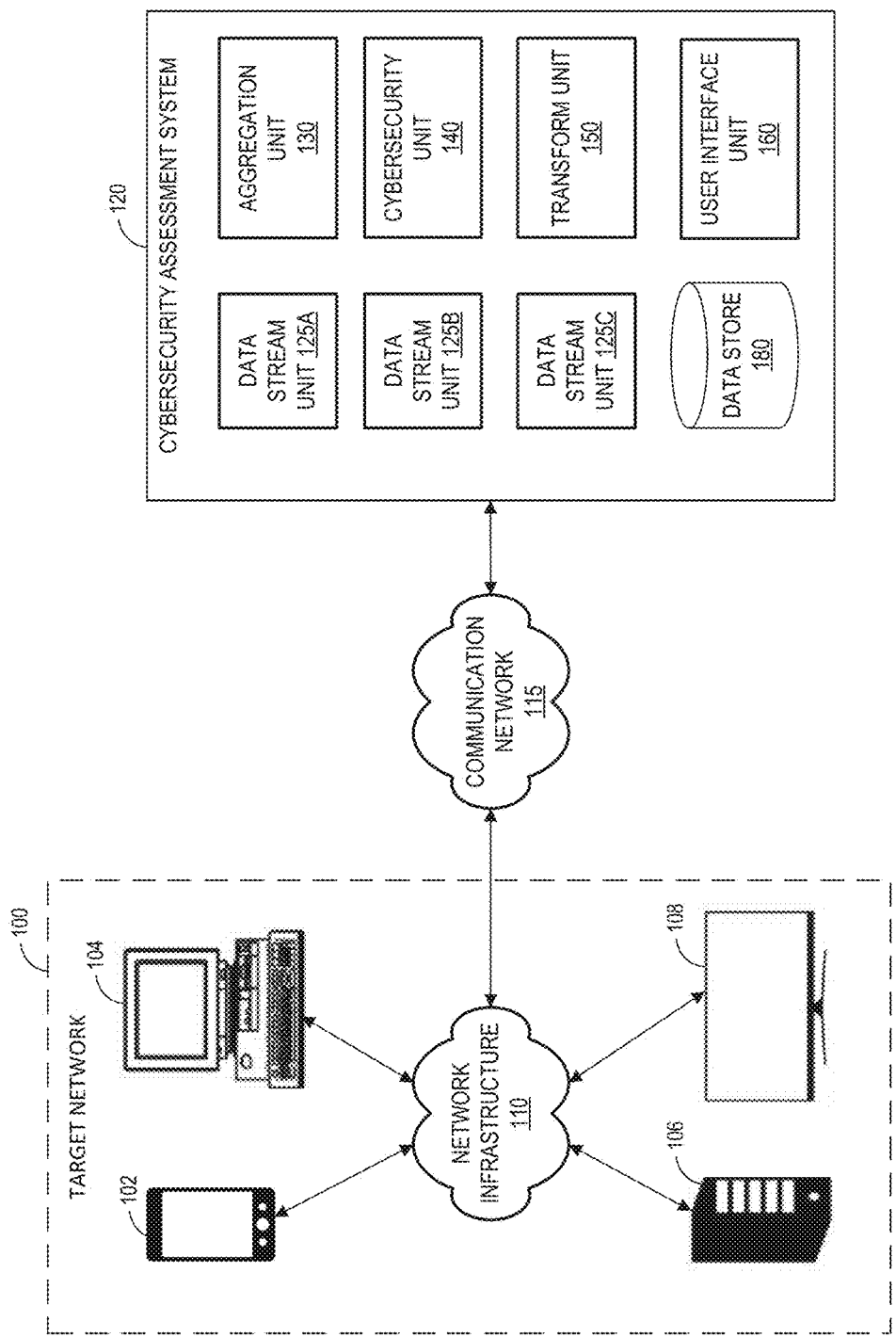
FIG. 1 is a block diagram of an illustrative computing environment including a cybersecurity assessment system and a target network according to some embodiments.

The present disclosure is directed to a cybersecurity assessment system for monitoring, assessing, and addressing the cybersecurity status of a target network. The cybersecurity assessment system may be a cloud-based system that accesses and scans the target network remotely. The scan may produce data regarding the current state and properties of devices on the target network, events occurring on the target network, vulnerabilities detected in devices on the target network, and the like. The cybersecurity assessment system can analyze the scan data and determine a degree to which the current status of the target network satisfies a particular cybersecurity assessment framework, and how the status changes over time. The cybersecurity assessment system can also transform large amounts of vulnerability scan data into efficient representations for use in providing interactive presentations of the vulnerabilities detected on the target network. The cybersecurity assessment system can also provide information regarding cybersecurity events in substantially real time.

Conventional systems for monitoring cybersecurity status are associated with a number of costs, inefficiencies, and undesirable effects. For example, conventional systems require the installation of software and/or hardware on the target network to scan the devices connected to the network. As another example, the output of a cybersecurity scan may be a document—which may be hundreds or thousands of pages in length—that provides a narrative of the scan data in a difficult-to-consume format designed to generate additional consultative work to interpret and address the scan data. As a further example, the scan tools require on-site administration to manage, run, and interpret the resulting data for actionable insights into the cybersecurity status of the target network. As yet another example, cybersecurity event alerting and remediation recommendations may not be integrated into the overall cybersecurity package and do not provide adequate information. These and other shortcomings of conventional systems make it difficult—if not impossible from a practical standpoint—for enterprises to efficiently and effectively monitor, assess, and address the cybersecurity status of their networks in substantially real-time.

Aspects of the present disclosure address, among other things, issues with cybersecurity assessment such as those discussed above. More specifically, a cloud-based cybersecurity assessment system is disclosed. The cybersecurity assessment system obtains, from multiple disparate sources, data regarding the cybersecurity status of a target network. The data may be obtained remotely, without necessarily requiring installation of any hardware or software at the target network site. For example, the data may include scan data regarding the current state of devices on the network, cybersecurity events occurring on the network, current vulnerabilities on the network, and the like. In some embodiments, the cybersecurity assessment system analyzes the scan data and determines the degree to which the current status of the target network satisfies the requirements of one or more cybersecurity assessment frameworks. The target network is initially assessed against individual factors (also referred to as "controls") of a framework to determine whether the target network satisfies the requirements of the framework. The scan data is analyzed to determine adjustments to initial assessment. For example, scan data can be used to "prove" whether an initial assessment of a particular control is indeed correct and shown in the scan data. As another example, scan data can be used to adjust the degree to which the target network satisfies individual controls at different levels between a binary yes/no initial assessment. Once the assessments of individual controls have been adjusted based on the objective scan data, an overall score can be determined for the target network indicating the degree to which target network has been shown—through objective scan data—to satisfy the requirements of the framework being used.

Additional aspects of the present disclosure relate to processing vulnerability scan data and presenting an interactive interface through which the vulnerability scan data can be accessed. The scan data generated by a vulnerability scan may be substantial (e.g., hundreds of gigabytes up to terabytes or more). Presenting such a large amount of data in an intelligent manner to allow users to get actionable insights may be difficult or impossible without first processing the data into an efficient form. In some embodiments, the cybersecurity assessment system can process the vulnerability scan data to identify duplicate instances of data items, such as references to specific vulnerabilities, remediation recommendations, network devices, etc. The system can remove duplicate instances and replace them with a single representative instance. Any number of unique data items can then be mapped to the representative instance instead of being associated with separate duplicate instances. By repeating this process for different types and groups of data items in the vulnerability scan data file, the initially large file can be dramatically reduced in size without any loss of data that is used when generating a dynamic user interface for viewing the vulnerabilities identified by the vulnerability scan. Illustratively, the vulnerability user interface may be an interactive display that summarizes the vulnerabilities detected across the network, provides detailed information regarding individual vulnerabilities, and allows presentation at various degrees of granularity between these extremes. For example, the vulnerability user interface may include color-coded severity indicators and display objects that represent groups of vulnerabilities (e.g., groups of devices that each exhibit a particular vulnerability or set of vulnerabilities). A user may activate an individual display object to obtain more information about the group of devices/vulnerabilities that the display object represents.

Although aspects of some embodiments described in the disclosure will focus, for the purpose of illustration, on particular examples of networks, devices, vulnerabilities, events, assessment frameworks, and scoring algorithms, the examples are illustrative only and are not intended to be limiting. In some embodiments, the techniques described herein may be applied to additional or alternative networks, devices, vulnerabilities, events, assessment frameworks, and scoring algorithms. Various aspects of the disclosure will now be described with regard to certain examples and embodiments, which are intended to illustrate but not limit the disclosure.

Network-Based Cybersecurity Assessment Environment

With reference to an illustrative embodiment, FIG. 1 shows an example network environment in which aspects of the present disclosure may be implemented. As shown, the network environment may include a target network environment 100 and a cybersecurity assessment system 120. The cybersecurity assessment system 120 and devices of the target network environment 100 may communicate with each via one or more communication networks 115. In some embodiments, a communication network 115 (also referred to simply as a "network") may be a publicly-accessible network of linked networks, possibly operated by various distinct parties, such as the internet.

Generally described, a target network environment 100 (also referred to as a "target network" for convenience) may be a network environment operated by an entity (e.g., an enterprise, user, or some other client). Target network 100 may comprise a plurality of interconnected devices that may communicate with one another via one or more communication networks, which may include or be separate from network 115. For example, target network 100 may include network infrastructure 110, which may be used to implement a personal area network ("PAN"), local area network ("LAN"), wide area network ("WAN"), global area network ("GAN"), or some combination thereof, any or all of which may or may not have access to and/or from the internet. In some embodiments, target network 100 may be an on-premises network environment which the network infrastructure and associated services are primarily provided on an entity's premises. In some embodiments, target network 100 may be a cloud-based network in which all or a significant portion of the network infrastructure and services are remotely provided by a network service provider separate from the entity. In some embodiments, target network 100 may be a hybrid in which some components and services are provided on an entity's premises, and some components and services are provided remotely by a network service provider.

In some embodiments, as shown in FIG. 1, a target network 100 includes various devices, such as one or more mobile devices 102, desktop devices 104, servers 106, audiovisual devices 108, other types of devices, or any combination thereof. Illustratively, mobile devices 102 may include mobile telephones with program execution and network communication capabilities (e.g. "smart phones"), wearable devices with program execution and network communication capabilities (e.g., "smart watches," "smart eyewear"), tablet computing devices, electronic reader devices, handheld video game devices, media players, notebook computers, and the like. Desktop devices 104 may include personal computing devices, terminal computing devices, and the like. Servers 106 may include "blade" servers, midrange computing devices, mainframe computing devices, and the like. Audiovisual devices 108 may include televisions with program execution and network communication capabilities (e.g., "smart TVs"), television set-top boxes, video game consoles, video cameras, still image cameras, microphones, speakers with program execution and network communication capabilities (e.g., "smart speakers"), and the like.

While the example of FIG. 1 displays a limited set of example mobile devices 102, desktop devices 104, servers 106, and audiovisual devices 108, it will be appreciated that other arrangements may exist in other embodiments. For example, a target network 100 associated with a large enterprise may comprise hundreds or thousands of personal computing devices, servers, cameras, televisions, wireless routers, telephones, and/or other network-connected devices. In some embodiments, other types of devices altogether may be part of a target network 100. For example, a target network may include network-enabled printers, copiers, scanners, fax machines, medical devices, appliances, lights, vehicles, or any other device with network communication capabilities.

Cybersecurity assessment system 120 may be configured to evaluate the cybersecurity posture of the network environment represented by target network 100 by connecting to the target network 100 via network 115. For example, the cybersecurity assessment system 120 may connect to the target network 100 through a virtual private network ("VPN") connection over the network 115. Communication with the target network 100 may therefore occur using such a VPN tunnel. In this way, the cybersecurity assessment system 120 can be provided with secure access to the target network 100 even though the cybersecurity assessment system 120 is remote from the target network 100, and even though communications to/from the target network 100 occur over the network infrastructure of network 115. A single cybersecurity assessment system 120 may be configured to assess the cybersecurity status of any number of target networks 100. In some embodiments, a single target network 100 may be assessed by multiple cybersecurity assessment systems 120.

Cybersecurity assessment system 120 may comprise a plurality of components. In some embodiments, cybersecurity assessment system 120 comprises one or more data stream units 125 (e.g., data stream unit 125A, data stream unit 125B, data stream unit 125C), aggregation unit 130, cybersecurity unit 140, transform unit 150, user interface unit 160, and data store 180. Individual components of the cybersecurity assessment system 120 may be implemented one or more computing devices. For example, each component may be implemented on a separate computing device, or separate set of computing devices. As another example, a single computing device or set of computing devices may be shared among multiple components. In some embodiments, the features and services provided by the cybersecurity assessment system 120 may be provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

As discussed in greater detail below, cybersecurity assessment system 120 may monitor the status of target network 100 by processing one or more streams of data regarding the target network 100. For example, data stream unit 125A may be configured to generate a first data stream by continuously monitoring the current hardware and/or software configuration status of devices in target network 100. This data stream may be referred to as continuous cybersecurity monitoring ("CCM") data, or simply as "continuous monitoring data" for convenience. As another example, data stream unit 125B may be configured to generate a second data stream corresponding to system logs, event logs, error logs, and/or other event data collected from devices of the target network 100. This data stream may be referred to as a secure information and event management ("SIEM") data, or simply as "event data" for convenience. As a further example, data stream unit 125C may be configured to generate cybersecurity vulnerability data identifying vulnerabilities in hardware and software components in a network environment, such as missing updates, unsecured ports, deprecated technology, and the like. This data stream may be referred to as "vulnerability data." Collectively, the data generated by the data stream units may be referred to as raw cybersecurity scan data, or simply as "raw scan data" for convenience.

In some embodiments, aggregation unit 130 may receive the raw scan data generated by data stream units 125A, 125B, and 125C and store the data in a format that may be more easily utilized by other components of the cybersecurity assessment system 120. The aggregation unit 130 may do so by first converting the raw scan data into a specified file format. The aggregation unit 130 may access the raw scan data generated by the plurality of data streams in one or more databases, files, or other data storage structures. In some embodiments, the raw scan data may be stored by the data stream units 125 in a database or distributive file system (e.g., a file system utilizing Hadoop Distributed File System or "HDFS" architecture) for fast access to large data sets, in a relational database (e.g., a Structured Query Language or "SQL" database), or the like. The aggregation unit 130 may format the raw scan data into a format usable by downstream components, such as the cybersecurity unit 140, transform unit 150, etc. Illustratively, the aggregation unit 130 may process the data into a structured format such as one or more JavaScript Object Notation ("JSON") files, extensible Markup Language ("XML") files, or the like. In some embodiments, the processed data may be stored in data store 180. Collectively, the processed data may be referred to as cybersecurity scan data, or simply as "scan data" for convenience.

The scan data compiled and stored by the aggregation unit 130 may be accessed by cybersecurity unit 140, transform unit 150, user interface unit 160, and/or other components of the cybersecurity assessment system 120 to provide various features, as discussed in greater detail below. In some embodiments, cybersecurity unit 140 may utilize an algorithm to assess the current cybersecurity posture or "status" of the target network 100 based at least partly on the scan data. An example algorithm for assessing the current cybersecurity status of the target network 100 with respect to a cybersecurity assessment framework is discussed in greater detail below with respect to FIGS. 7 and 8. The result of the cybersecurity status assessment can be presented using one or more user interfaces, such as the interfaces shown in FIGS. 2 and 3. In some embodiments, vulnerability scan data can be processed by the transform unit 150 to generate an efficient data structure representing all vulnerabilities discovered on the target network 100. An example algorithm for transforming vulnerability scan data is described in greater detail below with respect to FIGS. 9 and 10. The resulting data structure can be used to present vulnerability data using one or more user interfaces, such as the interfaces shown in FIGS. 2 and 4. In some embodiments, event data can be presented via one or more user interfaces, such as the interfaces shown in FIGS. 2 and 6.

User Interfaces

Figure 2:
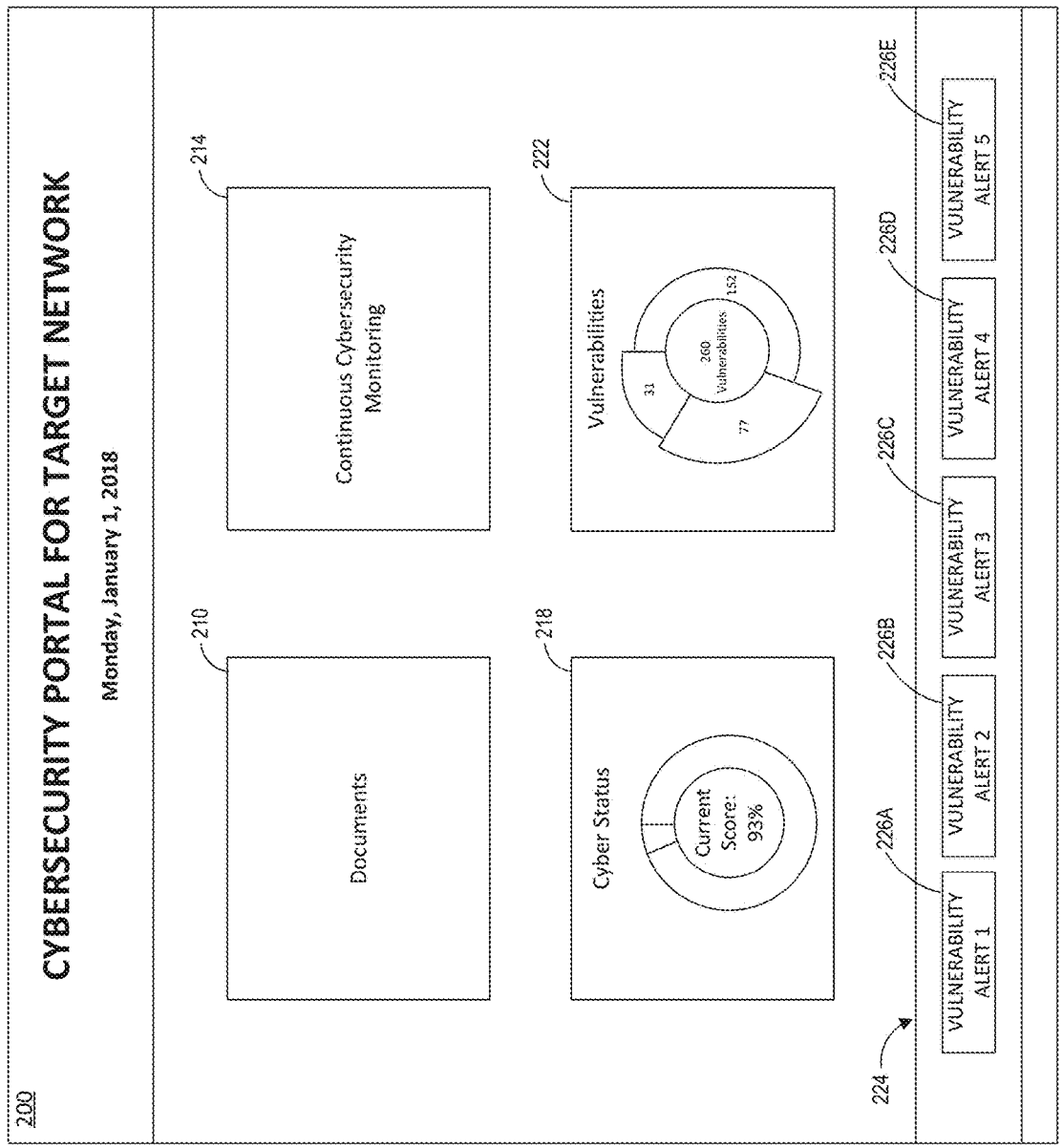
FIG. 2 is a user interface diagram of cybersecurity portal showing various interactive tools for assessing cybersecurity status and information regarding a target network according to some embodiments.

FIG. 2 is a user interface diagram of a cybersecurity portal interface 200 showing various interactive tools for assessing cybersecurity status and information regarding a target network 100. Illustratively, portal interface 200 may provide an easy-to-understand display of high-level cybersecurity information regarding the target network 100 on a single page or screen. Users may also access more detailed cybersecurity information through the portal interface 200 if desired.

Portal interface 200 may comprise various options 210, 214, 218, and 222 that a user may select to view specific presentations associated with the cybersecurity assessment system 120. In the example of FIG. 2, option 210 is titled "Documents" and may be associated with a documentation repository. In some embodiments, the user may access option 210 to view reports, vulnerability scans, or cybersecurity posture assessments of the target network 100. Option 214 is titled "Continuous Cybersecurity Monitoring" and may be associated with reports, controls, and configuration settings for managing the aspects of the cybersecurity assessment system. Option 218 is titled "Cyber Status." Selection of option 218 may cause presentation of an interface, such as cybersecurity status interface 300 discussed in greater detail below, that uses information generated through a cybersecurity status assessment process to visually represent the cybersecurity status of the target network 100 with respect to one or more cybersecurity assessment frameworks. In some embodiments, option 218 may be a dynamically-generated display that presents a summary of the current or most-recently-determined cybersecurity status of the target network 100 directly on portal interface 200 without necessarily requiring selection or other user interaction. Option 222 is titled "Vulnerabilities." Selection of option 222 may cause presentation of an interface, such as vulnerabilities interface 400, that utilizes vulnerability data to identify and present vulnerabilities detected on the target network 100, to present remediation recommendations to address the vulnerabilities, to provide export of vulnerability data to other systems, etc. In some embodiments, option 222 may include a dynamically-generated display that presents a summary of the current or most-recently-identified vulnerabilities of the target network 100 on portal interface 200 without necessarily requiring selection or other user interaction. For example, option 222 may include an instance of the vulnerabilities tracker 418 shown in FIG. 4 and discussed in greater detail below. Different visual characteristics of portions of displayed tracker may be dynamically determined to representing different dimensions of the vulnerability data being represented. Illustratively, color may be varied to represent severity, length may be varied to represent a count of vulnerabilities, width may be varied to represent a count of affected devices, other visual characteristics may be varied, other dimensions of vulnerability data may be used, and/or other combinations may be implemented.

In some embodiments, portal interface 200 may also include cybersecurity event ticker 224. Cybersecurity event ticker 224 can present real-time alerts, warnings, and notifications of cybersecurity events and risks detected during continuous cybersecurity monitoring, event scanning, and vulnerability scanning. In some embodiments, ticker 224 displays cybersecurity event display objects 226A, 226B, 226C, 226D, and 226E in the order in which each event is detected by the cybersecurity assessment system 120. In some embodiments, selection of a cybersecurity event object—or the ticker 224 in general—may cause display of ticker interface 500, discussed in greater detail below. While the ticker 224 is portrayed as a component of portal interface 200, it will be appreciated that in some embodiments the alerts and warnings presented in ticker 224 may be transmitted to a client system on the target network 100, stored in a database within the cybersecurity assessment system 120, or transmitted to a remote device.

Figure 3:
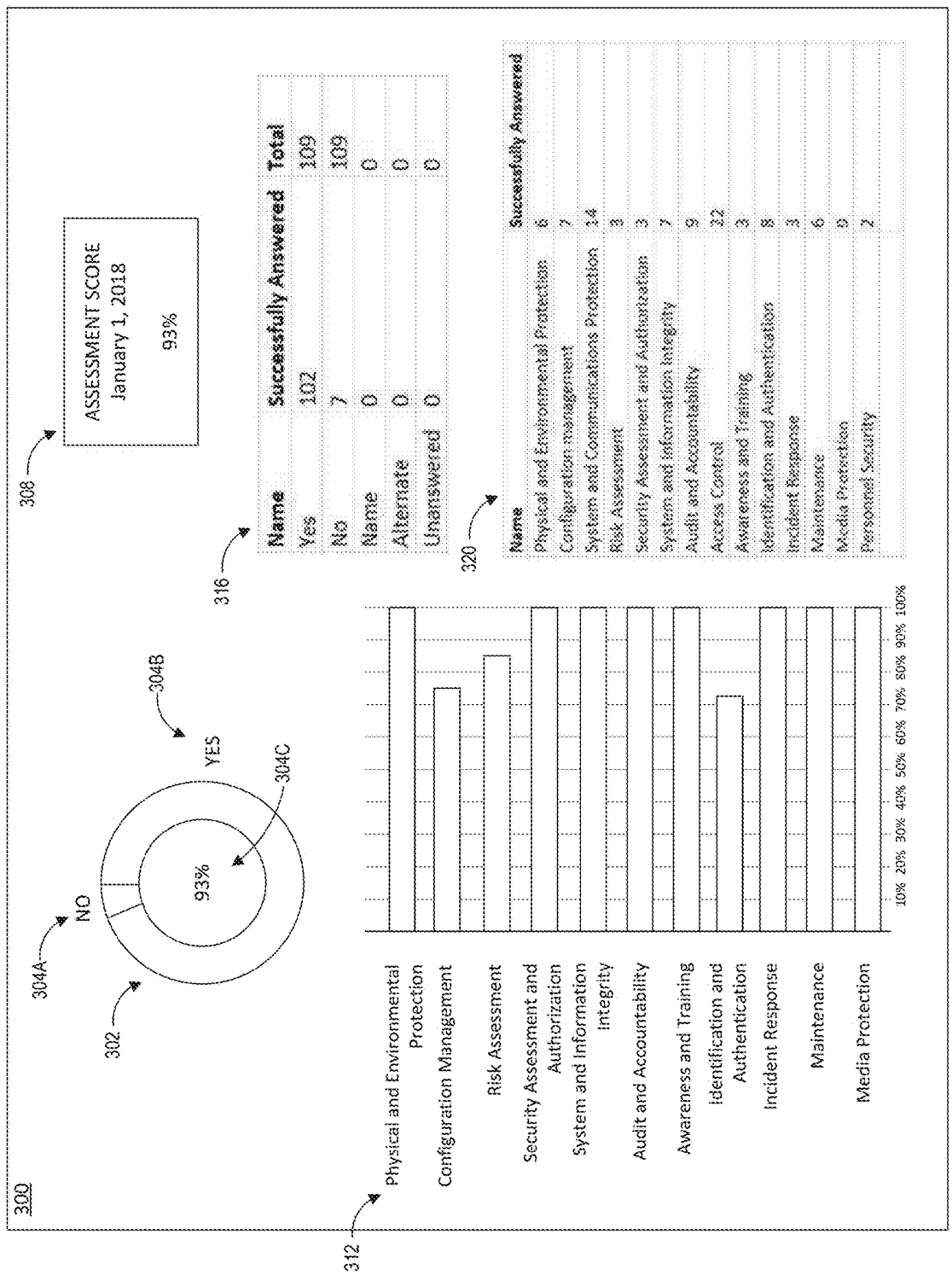
FIG. 3 is a user interface diagram showing a real-time cybersecurity status assessment of a target network according to some embodiments.

FIG. 3 is a user interface diagram showing a real-time cybersecurity status interface 300. In some embodiments, as shown, the cybersecurity status interface 300 comprises a dynamic cybersecurity status indicator 302, description boxes 308, 316, and 320, and cybersecurity assessment framework compliance chart 312. Cybersecurity status interface 300 may be used for presenting the current status of the target network 100 with respect to a particular framework in substantially real-time. In generating cybersecurity status interface 300, the user interface unit 160 or some other component of the cybersecurity assessment system 100 may analyze past and present assessments and remediation completions, and generate displays of the cybersecurity status. In some embodiments, the cybersecurity status interface 300 may incorporate data from previous and current cybersecurity reports, and present a dynamic visualization of the change in cybersecurity status over time.

Status indicator 302 presents a snapshot summary of overall cybersecurity status after the cybersecurity assessment system 120 has analyzed the current state of target network 100 with respect to a cybersecurity assessment framework. Status indicator 302 comprises sections 304A, 304B, and 304C, wherein section 304A visually represents a portion of all analyzed cybersecurity controls that target network 100 fails to fully satisfy, section 304B visually represents the portion of the analyzed cybersecurity controls that the target network 100 satisfies, and section 304C represents an overall assessment score (also referred to as the cybersecurity status score) for the target network 100. Box 308 presents a cybersecurity assessment score for the target network 100, which in this case is the total percentage of compliance with all requirements of a cybersecurity framework to date. Box 316 presents statistics pertaining to the proportion of satisfied cybersecurity framework requirements compared to the amount of such requirements that are deficient in the target network 100. The cybersecurity assessment system 120 may be able to compile these statistics by means of user-provided input or automatic detection based on the received data streams via data stream unit 125A, 125B, and/or 125C. In some embodiments, cybersecurity assessment framework controls and families of controls are analyzed and mapped to chart 312, wherein each family is associated with a level of completion based at least partly on the proportion of completed or satisfied controls in the family. In some embodiments, cybersecurity status interface 300 may display box 320 to represent specific statistics pertaining to the level of completion of cybersecurity assessment framework families listed in chart 312. While FIG. 3 illustrates a snapshot of the target network's cybersecurity posture, it will be appreciated that the interface 300 may change dynamically to reflect changes to the user system in real-time.

Figure 4:
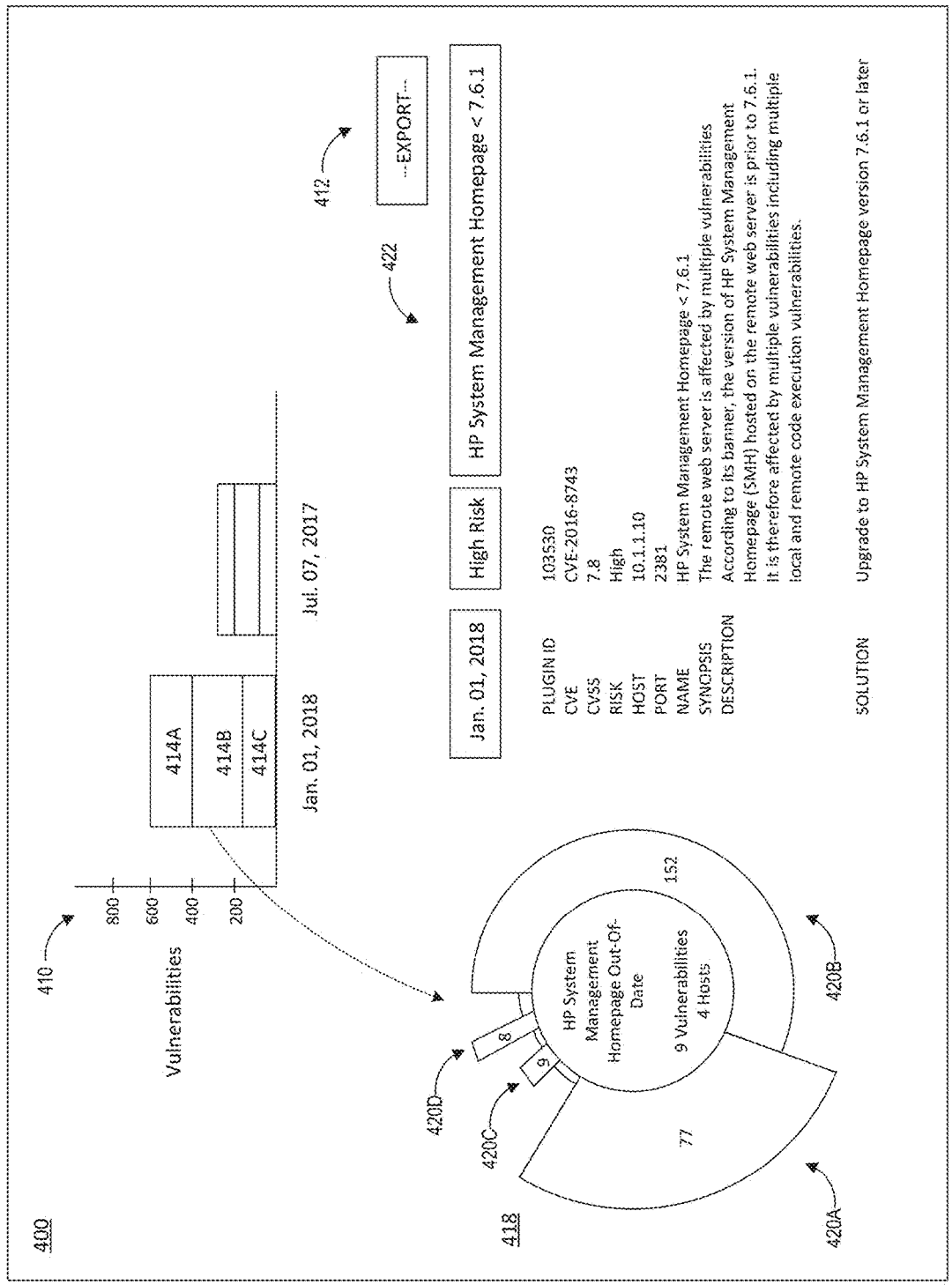
FIG. 4 is a user interface diagram showing cybersecurity vulnerability information for a target network according to some embodiments.

FIG. 4 is a user interface diagram of a vulnerabilities interface 400 showing cybersecurity vulnerability information for a target network 100. The vulnerabilities interface 400 comprises a chart 410 displaying historical statistics regarding the amount of vulnerabilities over a given time period. In some embodiments, chart 410 may categorize vulnerabilities according to category, such as a severity level. For example, the vulnerability record dated Jan. 1, 2018 in chart 410 comprises a total of 600 vulnerabilities that are divided into three top-level categories corresponding to three severity levels. Illustratively, chart 410 may be a bar chart with individual bars divided into sections 414A, 414B, and 414C, wherein section 414A represents the vulnerabilities associated with a critical severity level, section 414B represents vulnerabilities associated with a high severity level, and section 414C represent vulnerabilities associated with a medium severity level. In some embodiments, vulnerabilities may be associated with a particular severity level based on classifications presented in existing cybersecurity frameworks or by supervised training in a machine learning model using trained data sets associating particular vulnerabilities with a particular severity level. In some embodiments, each section 414A, 414B, and 414C may be selectable via a user input. Selecting a section 414A, 414B, or 414C may allow a user to further view details regarding the vulnerabilities of the selected severity level in dynamic vulnerabilities tracker 418.

In FIG. 4 a user has selected, using a selection action (e.g., a mouse click, touch gesture, keyboard shortcut, voice command, etc.), section 414B. Vulnerabilities interface 400 may then update display of dynamic vulnerabilities tracker 418 to provide a visual representation of collected statistics regarding the vulnerabilities determined to be associated with a high severity level (e.g., according to a cybersecurity framework or by the cybersecurity assessment system's own learned classification). In some embodiments, vulnerabilities tracker 418 may be a dynamic pie chart configured to visually represent multiple dimensions of information simultaneously by dynamically modifying visual characteristics of different sections of the vulnerabilities tracker 418 to represent the different dimensions of vulnerability information. For example, dynamic vulnerabilities tracker 418 may be configured to display an overall number of vulnerabilities associated with section 414B along with a relevant date and severity level associated with the vulnerability data of 414B. Furthermore, in some embodiments dynamic vulnerabilities tracker 418 may display a plurality of sections 420A, 420B, 420C, and 420D. Certain visual characteristics (e.g., length, width, color, visual texture) of each of sections 420A, 420B, 420C, and 420D may be customized to indicate how many detected vulnerabilities are determined to affect a quantity of different devices. For example, the length of section 420A (as measured in a circumferential direction) may represent 77 vulnerabilities, while the width of section 420A (as measured in a radial direction) may indicate that a set of 10 different devices in target network 100 are each affected by the same set of 77 vulnerabilities. Similarly, visual characteristics of section 420B may be customized to indicate that a set of 152 vulnerabilities affect each of a set of 5 different devices in target network 100, visual characteristics of section 420C may be customized to indicate that a set of 9 vulnerabilities affect each of a set of 3 different devices, and visual characteristics of section 420D may be customized to indicate that a set of 8 vulnerabilities affect each of a set of 8 different devices in the target network 100.

In some embodiments, each section 420A, 420B, 420C, and 420D may be associated with detailed information that may be accessed by a user through a user selection action (e.g., mouse click or a touch gesture). For example, a central portion of dynamic vulnerabilities tracker 418 may show a name or brief description of the vulnerabilities represented by the selected section (e.g., section 420C in this case). Vulnerabilities interface 400 may also update display window 422 to present detailed information in response to a user click on a section 420C. Window 422 may display date information, the severity level of the selection, a name of a vulnerability in section 420C, an identifier (e.g., a common vulnerabilities and exposures or "CVE" number) associated with the vulnerability, a synopsis of the vulnerability, a brief description of the vulnerability, and a proposed solution to address or remedy the vulnerability. The detailed information displayed in window 422 may, in some embodiments, be determined by cybersecurity assessment system 120 by referring to cybersecurity frameworks and vulnerability scans of the target network 100. For example, a standardized list of specific vulnerability identification numbers and corresponding vulnerabilities may provide a brief textual description of the vulnerability in question. In some embodiments, the information displayed in window 422 may also comprise learned information from a machine learning model (e.g., whether to classify a particular vulnerability associated with a vulnerability identification number as a high severity level). Although only one vulnerability associated with one host is displayed in window 422, it will be appreciated that the window 422 may display additional entries according to some embodiments. In some embodiments, data regarding the vulnerabilities displayed in window 422 may be exported to another system, to a file, etc. For example, a user may select export option 412 to initiate export of the vulnerability data.

Figure 5:
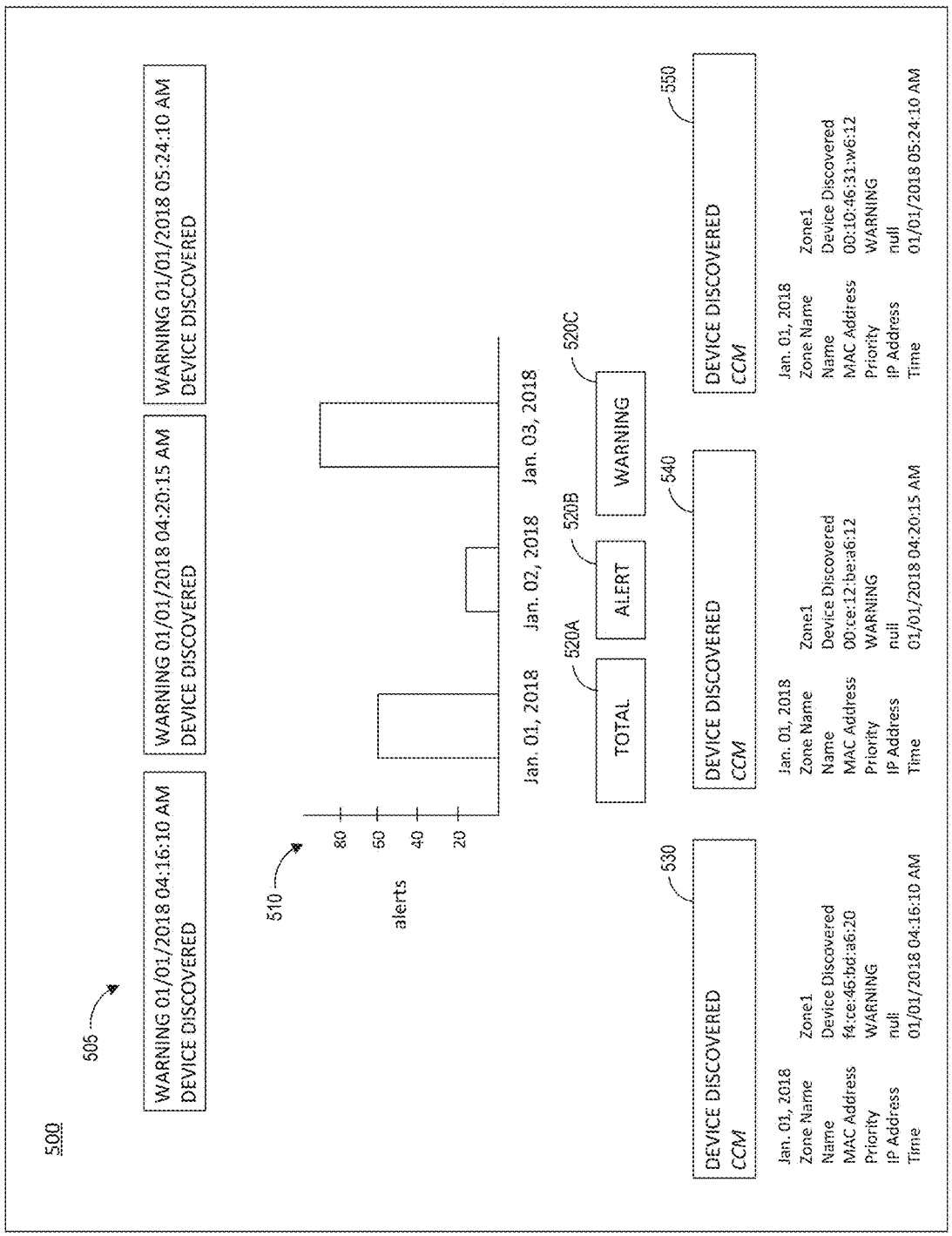
FIG. 5 is a user interface diagram showing a real-time ticker of cybersecurity events according to some embodiments.

FIG. 5 is a user interface diagram showing a real-time cybersecurity event ticker interface 500 for displaying cybersecurity event data. Ticker interface 500 may comprise ticker 505, event chart 510, and control elements 520A, 520B, and 520C. In some embodiments, ticker interface 500 may be accessed via portal 200. Ticker interface 500 may generate alerts and notifications based on analytics of data regarding cybersecurity events detected on the target network, including events dealing with devices, ports, vulnerabilities, software, users, and threat intelligence in correlation with the target network's cybersecurity monitoring. The data from which the events are detected may come from various scans of the target network 100, such as those discussed above and in greater detail below. Illustratively, this data may include event data, cybersecurity monitoring data, vulnerability data, other data, or some combination thereof. The cybersecurity assessment system 120 can analyze the data based on various detection rules to identify which events are to be added to the ticker 505. The detection rules may specify particular characteristics of events that are to be added to the ticker 505, such as events with a particular level of severity (e.g., critical events specified as such in the scan data itself) and/or events that satisfy certain use cases (e.g., critical events that are detected based on data from multiple sources, which a single source may not identify as critical). For example, an unsuccess login event followed by a successful login event on a weekday morning at 9:00 AM may both be recorded in an event log, and the records (or data derived therefrom) may be included in event data. When the cybersecurity assessment system 120 analyzes the event data, it may determine not to include either of these events in the ticker 505 because they do not satisfy any detection rules (e.g., the unsuccessful and successful logins are within expected parameters) and/or the events is not flagged as critical during event scanning. However, a successful login event on a weekend at 2:00 AM (with or without a prior unsuccessful login event), or three consecutive unsuccessful events at any time (with or without a subsequent successful login event) may satisfy the conditions of a use case to be included in the ticker 505 (or to be the subject of some other type of alert).

Ticker 505 may display recent alerts that are responsive to events in real-time and represent all detected use cases or cybersecurity events. In some embodiments, ticker 505 may dynamically update to include warnings or alerts from cybersecurity events that occur in real-time. Alerts and warnings displayed in the ticker 505 may be selected via user input to display detailed information regarding the selected alert or warning. For example, ticker entries 530, 540, and 550 each display warning messages received on Jan. 1, 2018 in chronological order, corresponding to the items in ticker 505 (and, in some embodiments, corresponding to items in ticker 244 of the portal interface 200). Each entry 530, 540, and 550 may contain detailed information, such as the name of the warning or alert, the MAC address of the affected device, the priority type of the entry, an IP address associated with the affected device, and a time of the alert or warning.

Event chart 510 visually displays historical data regarding alerts and warnings detected by the cybersecurity assessment system 120. In some embodiments, event chart 510 may illustrate a change in the amount of alerts the system receives over a set period in time (e.g., over the course of a week, month, or year). In some embodiments, control elements 520A, 520B, and 520C may be used to filter the results shown in the ticker entries 530, 540, and 550. For example, if a user clicks on button 520C, then the ticker interface 500 may only display cybersecurity events associated with a "WARNING" Priority category.

Cybersecurity Scanning

Figure 6:
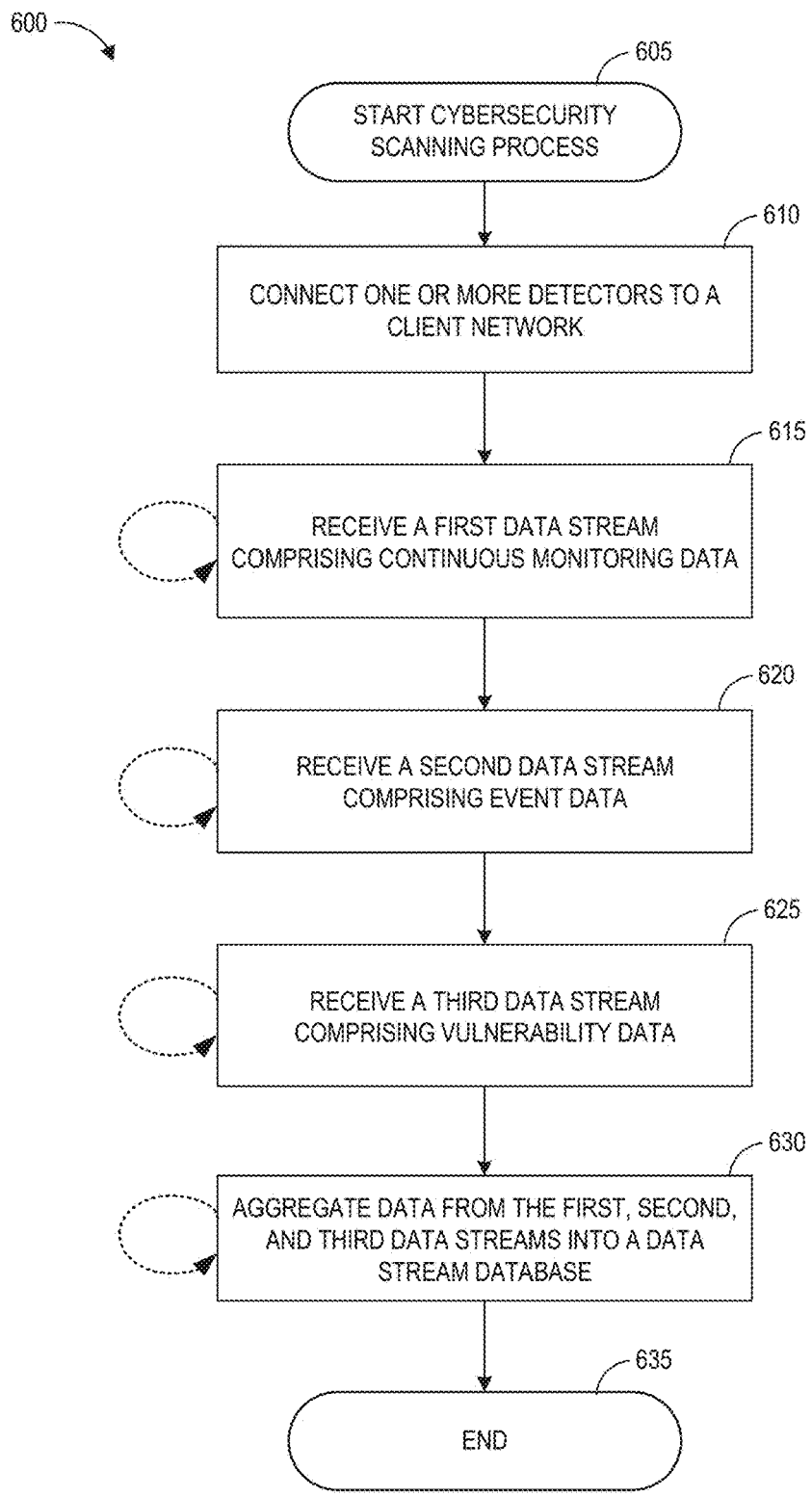
FIG. 6 is a flow diagram of an illustrative process for scanning a target network and obtaining cybersecurity scan data according to some embodiments.

FIG. 6 is a flow diagram of an illustrative process 600 for scanning a target network 100 and obtaining cybersecurity scan data. Process 600 begins at block 605. Illustratively, process 600 may begin automatically in response to an event or on a predetermined or dynamically-determined schedule. In some embodiments, process 600 may be initiated by a system administrator, client, or the like.

At block 610, the cybersecurity assessment system 120 may connect one or more scanning components to a target network 100 to obtain raw cybersecurity scan data. In some embodiments, data stream units 125A, 125B, 125C, other data stream units, or some combination thereof may be configured to connect to target network 100 via network 115 (e.g., using a VPN connection through network 115).

At block 615, data stream unit 125A may generate continuous monitoring data by performing device discovery and profiling on all devices that have joined target network 100. For example, data stream unit 125A may obtain information about any device with an internet protocol ("IP") address on the target network 100, and add the information (or information derived therefrom) to the continuous monitoring data. The information for a given device may include: hardware characteristics (e.g., device type, device vendor, installed hardware components); software characteristics (e.g., operating system type and version, installed application components, etc.); metadata regarding the device's connection to the target network (e.g., IP address, media access control or "MAC" address, secure communication certificates such as Secure Sockets Layer or "SSL" certificates, etc.); other information; or any combination thereof. The continuous monitoring data may come in the form of data representing a complete scan in which every device connected to the target network 100—or some subset thereof—is scanned, continuous monitoring data is generated, and then the process of scanning every device on the network begins again. In some embodiments, discrete sets or items continuous monitoring data may be generated for subsets of devices, device-by-device, or characteristic-by-characteristic, as the data stream unit 125A scans the target network 100.

At block 620, data stream unit 125B may generate event data by obtaining event logs from devices on the target network 100. For example, data stream unit 125B may obtain event logs, security logs, error logs, and the like. The log data for a given device may include: records of individual logins; records of individual logouts; records of individual unsuccessful logins; records of individual web site visits; records of applications executed; records of individual file creation, access, modification, and delete events; records of warnings and/or errors; other information; or any combination thereof. Records for individual events may include timestamps representing the time of the event, unique device identifiers (e.g., IP address, MAC address), unique event identifiers, event descriptions, categories (e.g., network event, application event, error), severity levels (e.g., critical, high, medium, low), etc. The event data may come in the form of data representing a complete scan in which logs on every device connected to the target network 100—or some subset thereof—are scanned and the content of the logs (or data derived therefrom) is added to the event data. In some embodiments, when log files on a device are updated, the updated log information may be provided to the data stream unit 125B.

In some embodiments, the data stream unit 125B may be configured to analyze log files and/or other information to detect the occurrence of particular events satisfying particular criteria, separate from the events that are recorded in the logs by the devices themselves. Such detected events and associated criteria may be referred to as "use cases." For example, a use case for a particular target network 100 may involve detecting occurrence of a "high risk" login event when a user account is used to log into a device more than a threshold period of time before or after such a log in event is expected (e.g., at 2:00 AM, when logins for this user account or device typically occur at 9:00 AM+/−1 hour). When event data are analyzed and criteria for a use case are satisfied, event data for a custom use case event can be generated. A given target network 100 may use any number of use cases, and different target networks 100 may use the same or different use cases.

At block 625, data stream unit 125C may generate vulnerability data by scanning devices on the target network 100 to detect cybersecurity vulnerabilities. Generally described, vulnerabilities include any state, configuration, or characteristic of a device that puts the device at risk from a cybersecurity standpoint. For example, vulnerabilities may include: missing or out of date security components; missing or out of date corrective measures ("patches"); communication ports being open when they should not be open; use of unsupported or otherwise deprecated technology; etc. Data stream unit 125C may communicate with devices on the network to: obtain metadata indicating the current version or state of software and/or hardware components of the device; detect which communication ports are open; detect the signature of various other vulnerabilities; etc. Illustratively, the vulnerabilities that are detected by the data stream unit 125C may be defined in a standardized list of known vulnerabilities (e.g., the list of common vulnerabilities and exposures, also known as "CVEs"). Data representing the vulnerabilities may include unique device identifiers, unique vulnerability identifiers (e.g., ID numbers from a list of known vulnerabilities), vulnerability descriptions, categories, severity levels, etc.

At block 630, the cybersecurity assessment system 120 may aggregate the data from the first, second, and third data streams. In some embodiments, the raw scan data may be stored by the data stream units in a database or distributive file system (e.g., a file system utilizing Hadoop HDSF architecture) for fast access to large data sets, in a SQL database, or the like. The aggregation unit 130 may format the raw scan data into a format usable by downstream components, such as the cybersecurity unit 140, transform unit 150, etc. Illustratively, the aggregation unit 130 may process the data into a structured format such as one or more JSON files, XML files, etc. The formatted data may be stored in data store 180.

At block 635, process 600 may end. Although the blocks of FIG. 6 are shown and described as occurring sequentially, in some embodiments certain blocks may be performed in a different order, in parallel, asynchronously, repetitively, etc. For example, blocks 615, 620, and 625 may be performed concurrently after block 610. As another example, blocks 615, 620, 625, and/or 630 and may be repeated continuously until a stopping event occurs (e.g., a system administrator ends process 600).

Cybersecurity Status Processing

Figure 7:
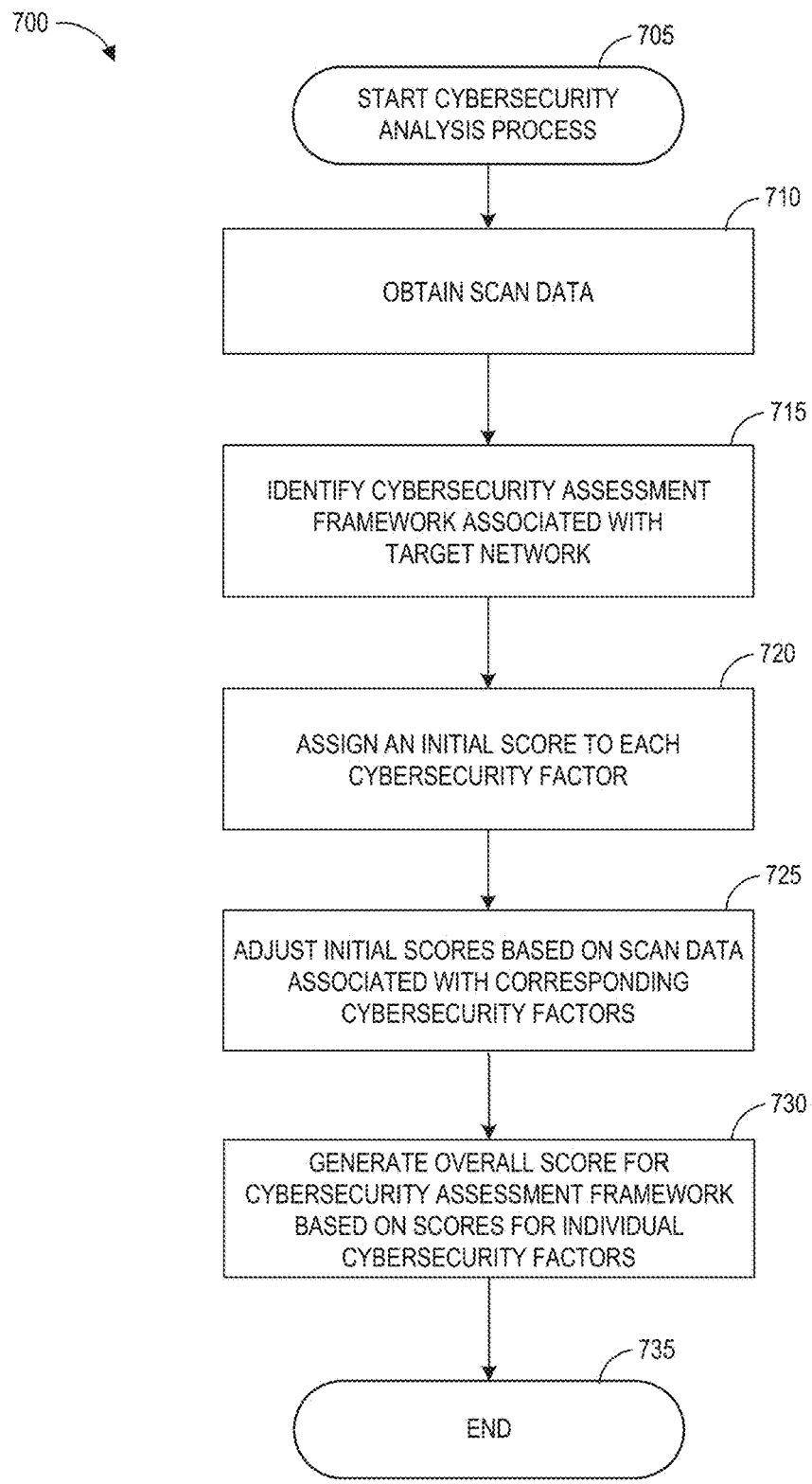
FIG. 7 is a flow diagram of an illustrative process for analyzing cybersecurity scan data and assessment data to determine a real-time cybersecurity status according to some embodiments.

FIG. 7 is a flow diagram of an illustrative process 700 for analyzing cybersecurity scan data and assessment data to determine a real-time cybersecurity status. Process 700 begins at block 705. Process 700 may begin in response to an event, such as when scan data is generated by the aggregation unit 130 or upon receiving a command from a system administrator. In some embodiments, process 700 may be executed according to a predetermined or dynamically determined schedule. When process 700 is initiated, a set of executable program instructions stored on one or more non-transitory computer-readable media (e.g., hard drive, flash memory, removable media, etc.) may be loaded into memory (e.g., random access memory or "RAM") of computing device. For example, cybersecurity analysis instructions 1174 shown in FIG. 11 may be loaded into memory 1166 of a cybersecurity assessment system computing device 1150 and executed by one or more processors 1160. In some embodiments, process 700 or portions thereof may be implemented on multiple processors (on the same or separate computing devices), serially or in parallel.

At block 710, cybersecurity unit 140 or some other component of the cybersecurity assessment system 120, may obtain scan data (e.g., as processed and stored in data store 180 during process 600).

At block 715, the cybersecurity unit 140 or some other component of the cybersecurity assessment system 120 may identify a cybersecurity assessment framework against which target network 100 is to be evaluated to determine the current cybersecurity status.

Generally described, a cybersecurity assessment framework is associated with a particular cybersecurity goal or set of goals, such as securing sensitive data, ensuring the integrity of transactions, preventing unauthorized operations, and the like. To help determine whether a given target network achieves the desired goal(s), a cybersecurity assessment framework may include any number of cybersecurity factors against which a target network is assessed for compliance. A cybersecurity factor is associated with a property or feature that is desirable to achieve the goal(s) of the cybersecurity assessment framework. Illustratively, a target network may be assessed to determine whether the property or feature is present and the cybersecurity factor is therefore satisfied. The assessment may be a binary assessment (either the cybersecurity factor is or is not satisfied) or it may be an assessment by matter of degree (the cybersecurity factor may be partially satisfied to varying degrees between total satisfaction and total failure). A total score for the cybersecurity assessment framework may be generated based on scores determined for individual cybersecurity factors. The total score represents the degree to which the target network is in compliance with the applicable cybersecurity assessment framework, and thus the total score may represent the current cybersecurity status of the target network.

A cybersecurity assessment framework, also referred to as a cybersecurity framework for convenience, may include tens, hundreds, or more individual cybersecurity factors. In some embodiments, the cybersecurity factors may be grouped into subsets of similar or related cybersecurity factors. Cybersecurity factors may also be referred to as "controls," and subsets of similar or related cybersecurity factors may also be referred to as "families." In one specific non-limiting embodiment, a cybersecurity framework may be based at least partly on a standardized set of requirements, such as National Institute of Standards and Technology ("NIST") 800-171, NIST 800-53, the Payment Card Industry Data Security Standard ("PCI DSS"), International Organization for Standardization/International Electrotechnical Commission ("ISO/IEC") 27001, or the Center for Internet Security ("CIS") Critical Security Controls.

In some embodiments, the cybersecurity assessment system 120 may be configured to assess target networks for compliance with multiple distinct cybersecurity frameworks. Each cybersecurity framework may or may not share individual cybersecurity factors or subsets thereof with any number other cybersecurity frameworks. A single target network may be assessed for compliance with any or all of the cybersecurity frameworks available to the cybersecurity assessment system 100. For purposes of illustration, process 700 will be described with respect to assessment of a single target network 100 with respect to a single cybersecurity framework. Thus, at block 715, cybersecurity unit 140 identifies the cybersecurity framework associated with target network 100 (e.g., a database record associates the cybersecurity framework with target network 100), and loads the corresponding cybersecurity factors against which network 100 is to be evaluated.

Figure 8:
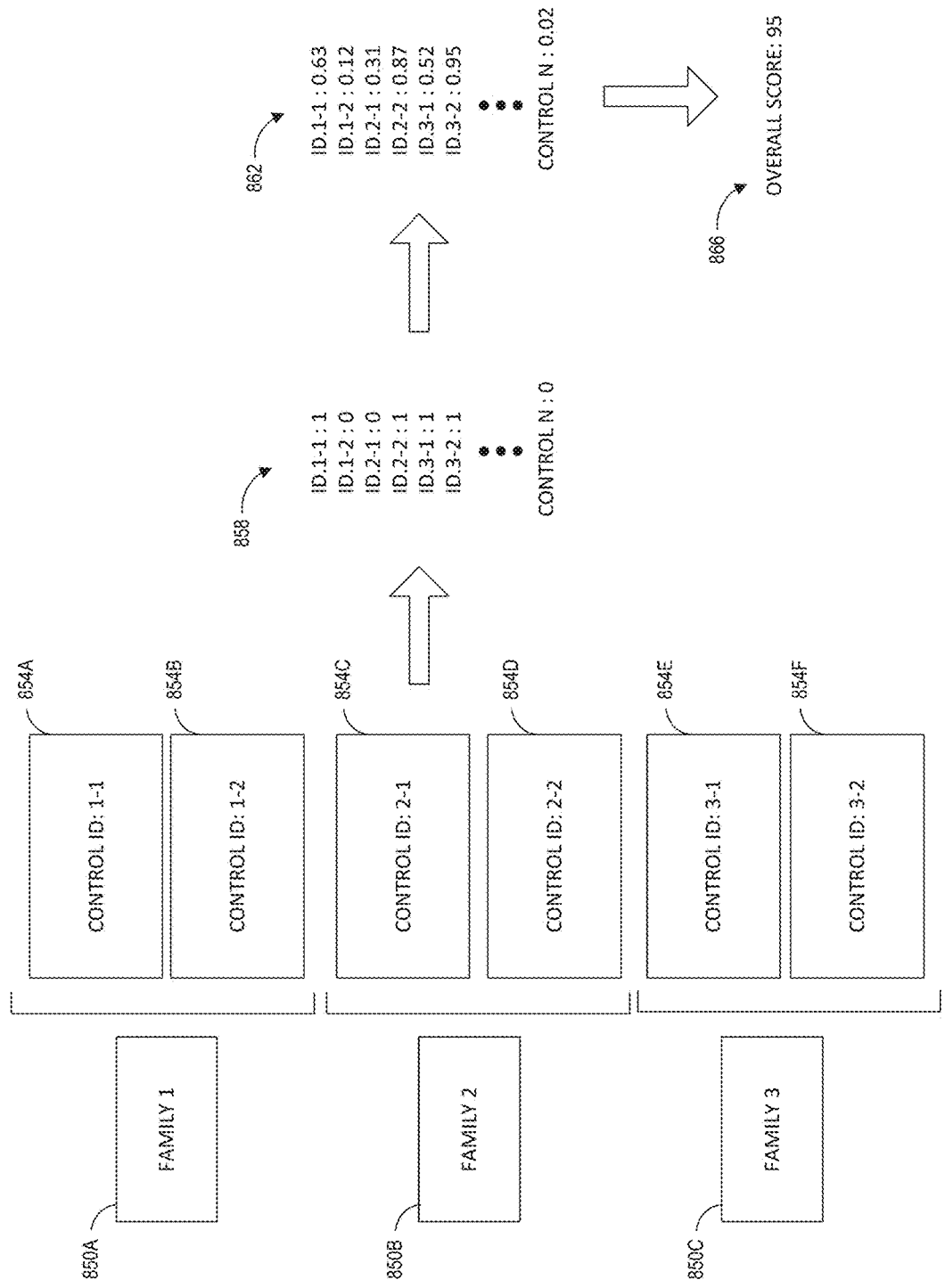
FIG. 8 is a flow diagram of an illustrative process for determining an overall cybersecurity score according to some embodiments.

FIG. 8 shows a portion of the cybersecurity framework against which target network 100 is being evaluated. The cybersecurity factors are organized into families 850A, 850B, and 850C. Each family 850A, 850B, and 850C may represent a particular grouping or commonalty of the associated cybersecurity factors. For example, family 850A includes controls 854A and 854B representing various aspects of cybersecurity preparedness. Family 850B includes controls 854C and 854D representing various aspects of cybersecurity preparedness. Family 850C includes controls 854E and 854F representing various aspects of cybersecurity preparedness.

Returning to FIG. 7, at block 720, the cybersecurity unit 140 or some other component of the cybersecurity assessment system 120 may assign an initial score to each cybersecurity factor or control identified in block 715. As shown in list 858 of FIG. 8, the score associated with each control 854A-854F may comprise a binary representation "0" or "1," wherein a 0 is assigned to the particular control if compliance with the control is negative, and a 1 is assigned if compliance is positive. For example, control 854A may correspond to the use of a firewall on target network 100. If there is a firewall being used on target network 100, then control 854A may initially be assigned a score of 1, as shown in FIG. 8. Otherwise, if there is no firewall on target network 100, a score of 0 may initially be assigned to cybersecurity factor 854A. In some embodiments, the initial score assigned to a cybersecurity factor may be based on user input or feedback. For example, a user may be presented the list of cybersecurity factors and provide manual assessment responses for each cybersecurity factor or some subset thereof. Cybersecurity unit 140 can load the provided responses to set initial scores during the process 700. In some embodiments, the initial score may be set to the value determined during the last execution of process 700 for the same cybersecurity framework and target network. In some embodiments, the scores for cybersecurity factors or some subset thereof may be initialized to 0, and may only be raised based on subsequent operations of process 700.

At block 725, the cybersecurity unit 140 or some other component of the cybersecurity assessment system 120 may adjust the initial scores for various cybersecurity factors based on scan data associated with the corresponding cybersecurity factor. In some embodiments, scores may be adjusted between a minimum and maximum threshold, such as 0 and 1 respectively. To determine the specific adjustment to be made for a particular cybersecurity factor, cybersecurity unit 140 may access scan data that relates to the cybersecurity factor, perform a rules-based analysis of the scan data, and generate a specific adjustment. In some embodiments, the rules-based analysis may be implemented as a series of rules, applied in a predetermined or dynamically determined sequence, in which a data value is evaluated to determine whether the data value satisfies a threshold or range for the particular data value. If the data value satisfies the criterion (or criteria) for a given rule, then the rules-based analysis may specify a particular outcome or additional rule to be applied; otherwise, the analysis may specific a different outcome or rule to be applied.

For example, control 854A may correspond to the presence of a firewall on target network 100. As shown and discussed above, an initial score of 1 has been assigned to control 854A, indicating that there is a firewall on target network 140. Cybersecurity unit 140 can access scan data associated firewall usage beyond the mere presence of a firewall. Illustratively, cybersecurity unit 140 can determine the vendor, model number, software version, and service level of the firewall based on information obtained from continuous monitoring data and vulnerability data. Cybersecurity unit 140 can then analyze the data against a series of rules, such as: Is the model number the most recent model produced by the vendor? If so, apply a first adjustment, otherwise apply a second adjustment. Is the model still supported by the vendor? If so, apply a first adjustment, otherwise apply a second adjustment. Is the software version the most recent software version available for the model? If so, apply a first adjustment, otherwise apply a second adjustment. Does the model have critical unresolved vulnerabilities? If so, apply a first adjustment, otherwise apply a second adjustment. Is the firewall (or set of firewalls) configured to manage all traffic between devices of target network 100 and the internet? If so, apply a first adjustment, otherwise apply a second adjustment. In some cases, no adjustment may be applied instead of the first and/or second adjustments in this example set of rules.

Adjustments to initial scores may take the form of weights that initial scores are multiplied by to determine a resulting adjusted score. In some embodiments, adjustments may take the form of values to be added to or subtracted from initial scores to determine a resulting adjusted score. In some embodiments, adjustments may take the form of parameters to a function that used to calculate an adjusted score.

The example rules and adjustment methods discussed herein are illustrative only, and are not intended to be exhaustive, required, or limiting in any way. In some embodiments, fewer, additional, and/or alternative rules and methods may be used to adjust scores for any or all controls.

In some embodiments, cybersecurity until 140 may also or alternatively evaluate non-scan-related data. For example, manual assessment data about certain characteristics may be considered, such as whether the password for the firewall has been changed from the default password. Such non-scan-related data may be used when determining adjustments to initial scores, or when determining the initial scores themselves.

In block 730, the cybersecurity assessment system may generate an overall score to represent the overall cybersecurity posture of the target network 100. As shown in overall score 866 in FIG. 8, the adjusted scores of each individual control in list 862 are summed to generate the overall score 866. In some embodiments, the overall score may be a numerical value between a minimum and maximum threshold, such as 0 and 100 respectively. In this example, 0 indicates that no cybersecurity factor or control has been satisfied, and 100 indicates successful compliance with all cybersecurity factors for the current cybersecurity assessment framework.

In some embodiments, when the overall status score is presented (e.g., in portal interface 200 or cybersecurity status interface 300), the overall score may be associated with a color visually emphasizing the current cybersecurity status of the target network. For example, a perfect score of 100 may be associated with the color green, while a low score ranging from 0 to 25 may be associated the color red. Scores in intermediate ranges may be associated with other colors, such as the color yellow or orange.

At block 735, process 700 may end. Although the blocks of FIG. 7 are shown and described as occurring sequentially, in some embodiments certain blocks may be performed in a different order, in parallel, asynchronously, repetitively, etc. For example, blocks 710 and 715 may be performed concurrently or in a different order. As another example, blocks 715 and 720 may be performed currently with block 710.

Vulnerability Processing

Figure 9:
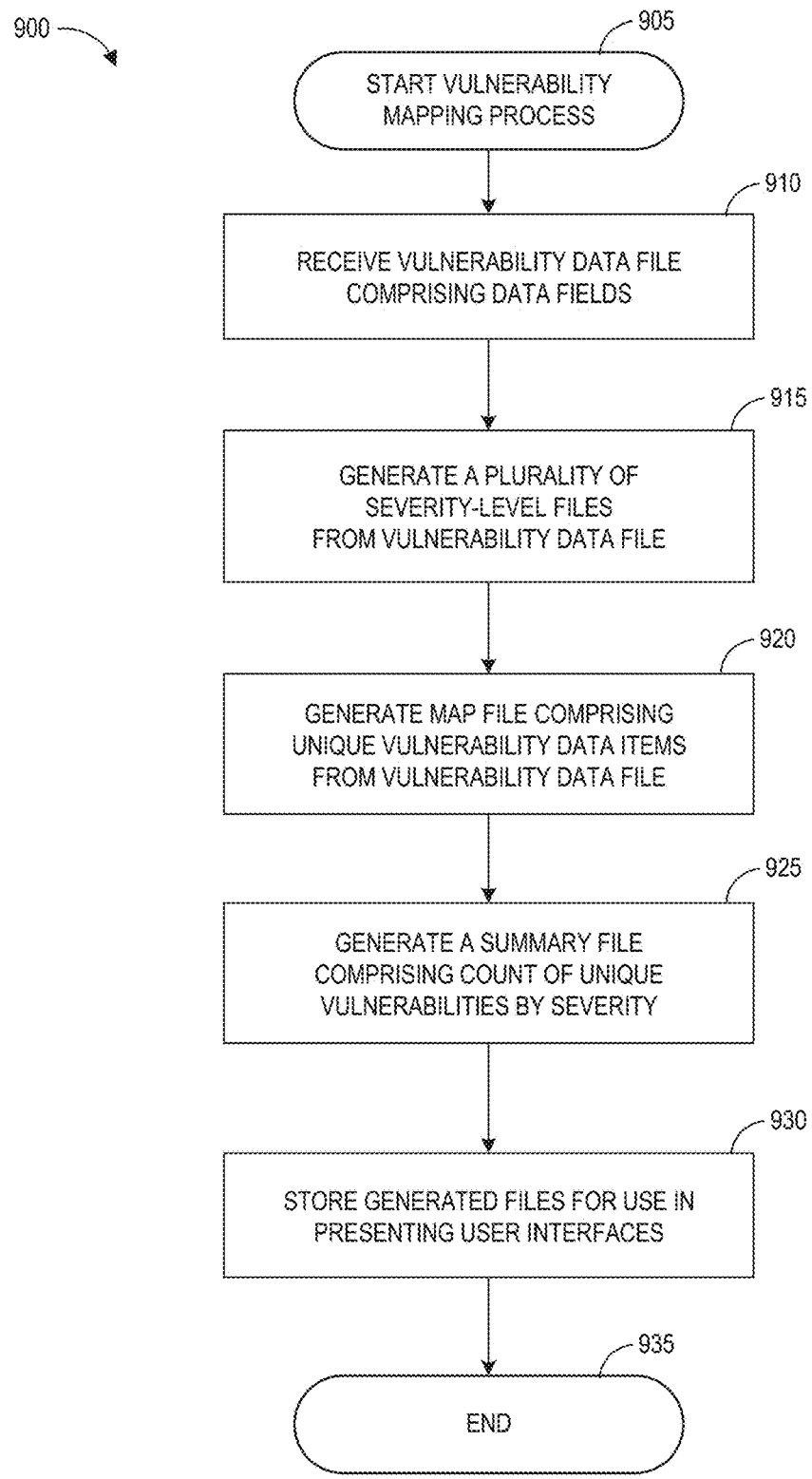
FIG. 9 is a flow diagram of an illustrative process for transforming a vulnerability scan data file into mapped format files for interactive presentation according to some embodiments.

FIG. 9 is a flow diagram of an illustrative process 900 for transforming a cybersecurity vulnerability scan file into mapped format files for interactive presentation. Process 900 begins at block 905. Process 900 may begin in response to an event, such as when scan data is generated by the aggregation unit 130 or upon receiving a command from a system administrator. In some embodiments, process 900 may be executed according to a predetermined or dynamically determined schedule. When process 900 is initiated, a set of executable program instructions stored on one or more non-transitory computer-readable media (e.g., hard drive, flash memory, removable media, etc.) may be loaded into memory (e.g., random access memory or "RAM") of computing device. For example, transform instructions 1176 shown in FIG. 11 may be loaded into memory 1166 of a cybersecurity assessment system computing device 1150 and executed by one or more processors 1160. In some embodiments, process 900 or portions thereof may be implemented on multiple processors (on the same or separate computing devices), serially or in parallel.

At block 910, the transform unit 150 or some other component of cybersecurity assessment system 120 may receive a vulnerability data file comprising multiple data fields. For example, the transform unit 150 may receive vulnerability data which may be a large structured data file (e.g., a file that is several gigabytes or terabytes in size). In some embodiments, the vulnerability data file may be in the form of a comma separated value ("CSV") file, tab delimited text file, JSON file, XML file, etc.

Figure 10:
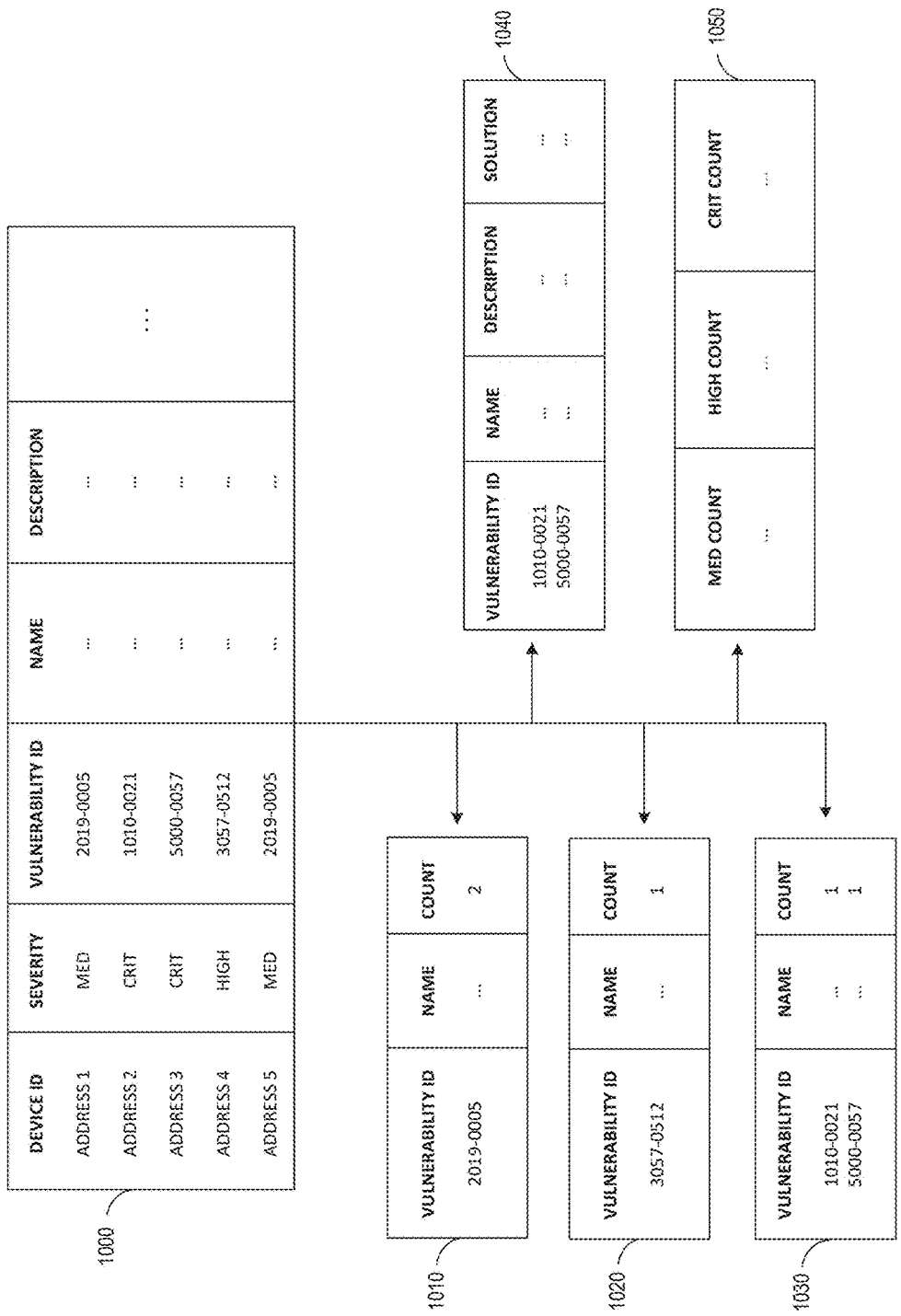
FIG. 10 is a block diagram of an illustrative cybersecurity vulnerability scan file and corresponding mapped format files according to some embodiments.

As shown in FIG. 10, the received vulnerability data file 1000 may comprise a row of data for each detected vulnerability. Each row may have a plurality of data fields, such as an identifier for the device in which the vulnerability was detected (e.g., an IP address), a severity indicator for the vulnerability (e.g., critical, high, medium, low), an identifier for the vulnerability (e.g., a CVE number), a vulnerability name, description, recommended remediation, etc.

At block 915, the transform unit 150 or some other component of cybersecurity assessment system 120 may copy portions of the vulnerability data file 1000 into a plurality of separate files, separated by a top-level category that is used during display by a user interface such as the portal interface 200 or vulnerabilities interface 400. For example, the vulnerability data may be separated using a multi-tier hierarchy of categories corresponding to severity indicators for the corresponding vulnerabilities (e.g., critical, high, medium, etc.). In some embodiments, the plurality of top-level category files may be structured similarly to the vulnerability data file (e.g., CSV files, XML files, etc.).

As shown in FIG. 10, in some embodiments, the plurality of top-level category files may comprise three severity files 1010, 1020, and 1030, wherein file 1010 is associated with a medium severity level, file 1020 is associated with a high severity level, and file 1030 is associated with a critical severity level. In some embodiments, the severity labels may be incorporated as data fields in the original vulnerability data file 1000 and may be used to generate the three separate severity files. Each severity file may include a set of data entries associated with the corresponding level of severity, and individual entries may include a vulnerability identifier, a vulnerability name, and a count of the number of instances of the vulnerability that have been detected (e.g., the number of devices affected by the vulnerability). Using these files, vulnerabilities interface 400 can present dynamic vulnerabilities tracker 418, which provides a visual representation of collected statistics regarding the vulnerabilities determined to be associated with a particular severity level.

At block 920, the transform unit 150 or some other component of cybersecurity assessment system 120 may scan the vulnerability data file for unique vulnerabilities to include in a map file. For example, the vulnerability data file 1000 may include a vulnerability identifier that appears multiple times throughout the vulnerability data file 1000. The transform unit 150 may extract data associated with the vulnerability identifier for entry into a map file 1040. In some embodiments, a key-value pair is created associating the vulnerability identifier with various other data elements, such as name, synopsis, description, and solution. If a particular vulnerability is already included in the map file 1040, then the transform unit 150 may skip the current record for that vulnerability without duplicating it in the map file 1040. Therefore, each unique vulnerability identifier will only appear once in the map file 1040 rather than appear perhaps hundreds of times as in the original vulnerability data file 1000. Advantageously, use of the map file 1040 may result in a condensed list of unique vulnerability identifiers, thereby reducing the computing resources required to store, load, process, or reference the map file 1040—in comparison with the much larger original vulnerability data file 1000—when performing other processes, such as generating user interfaces, performing cybersecurity assessments, providing exports of vulnerability data, etc.

In some embodiments, the map file 1040 may also include unique instances of other information, such as unique groups of device identifiers to which the unique vulnerability records in the map file 1040 apply. For example, there may be several (e.g., dozens, hundreds, or more) records in the vulnerability data file 1000 referencing a particular vulnerability identifier if the corresponding vulnerability was detected on multiple distinct devices. As discussed above, a single vulnerability record in the map file 1040 may replace the multiple duplicate copies of the same vulnerability in the vulnerability data file 1000. However, the device identifiers for each of the different devices affected by the vulnerability may be unique, and unable to be included in the single vulnerability record in the map file 1040. To ensure that each device affected by vulnerability can continue to be determined, the vulnerability record in the map file 1040 may be cross-referenced (e.g., associated with a pointer or unique key) to a listing of the unique identifiers for the different devices affected by the vulnerability. In some embodiments, the listing of unique device identifiers may also be stored in the map file 1040. In addition, if multiple vulnerabilities each affect the same group of devices, then multiple vulnerability records in the map file 1040 may be cross-referenced to the same listing of device identifiers, further conserving memory space and other computing resources in comprising with the original vulnerability data file 1000.

At block 925, the transform unit 150 or some other component of cybersecurity assessment system 120 may generate a summary file 1050 comprising a count of vulnerabilities by top-level category, such as severity. As shown in FIG. 10, summary file 1050 includes a count of vulnerabilities for each severity level. The counts may be determined by counting the number unique instances of each vulnerability identifier and severity level identifier occurring together in the vulnerability data file 1000. Using the summary file 1050, an interface such as the portal interface 200 can present a summary of the vulnerabilities by severity type in the vulnerabilities option 222. As another example, vulnerabilities interface 400 can present chart 410 categorizing vulnerabilities according to severity level.

At block 930, transform unit 150 or some other component of cybersecurity assessment system 120 may store the generated files for later use in presenting user interfaces, performing cybersecurity assessments, and the like. Illustratively, the files 1010, 1020, 1030, 1040, and 1050 may be stored in data store 180. In some embodiments, the different files may not be stored as physically separate files, but may be integrated into a single file.

At block 935, process 900 may end. Although the blocks of FIG. 9 are shown and described as occurring sequentially, in some embodiments certain blocks may be performed in a different order, in parallel, asynchronously, repetitively, etc. For example, blocks 915, 920, and/or 925 may be performed concurrently or in a different order.

Example Device Components

Figure 11:
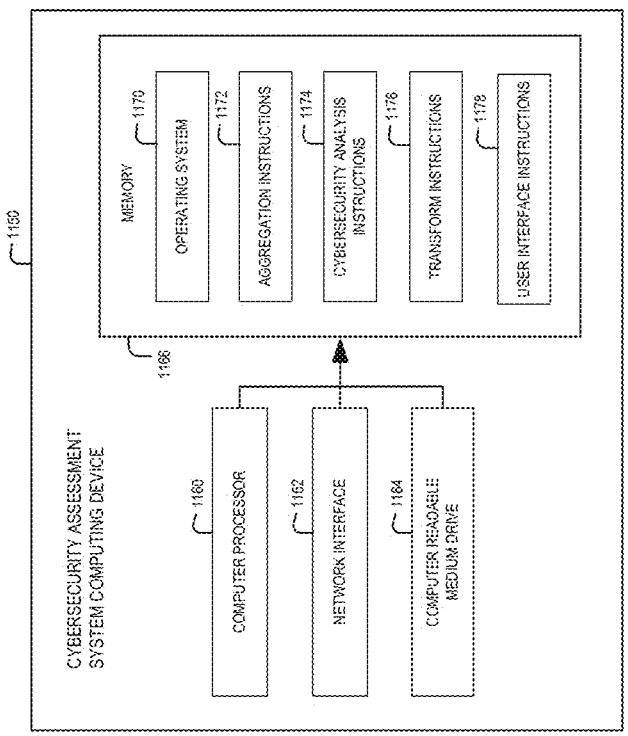
FIG. 11 is a block diagram of illustrative computing systems configured to implement features of the present disclosure according to some embodiments
Figure 11:
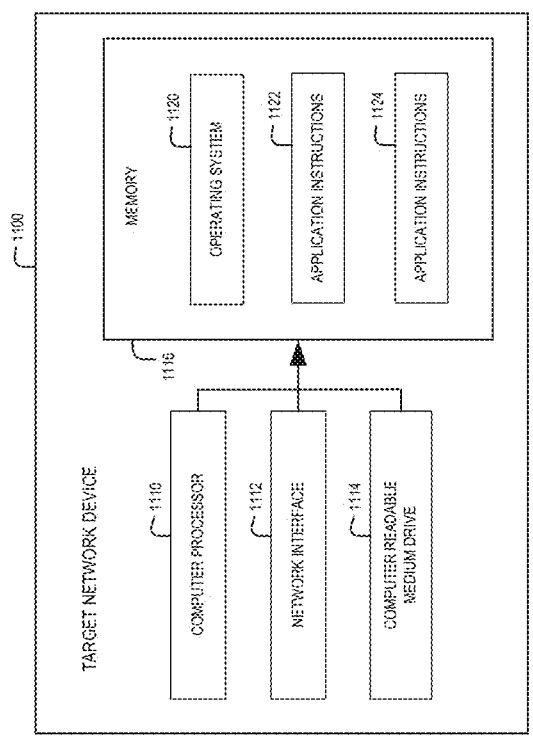

FIG. 11 shows components of an illustrative target network device 1100 (e.g., a mobile device 102, desktop device 104, server device 106, etc.), and a cybersecurity assessment system computing device 1150.

In some embodiments, as shown, the target network device 1100 may include: one or more computer processors 1110, such as physical central processing units ("CPUs"); one or more network interfaces 1112, such as a network interface cards ("NICs"); one or more computer readable medium drives 1114, such as a high density disk ("HDDs"), solid state drives ("SDDs"), flash drives, and/or other persistent non-transitory computer-readable media; and one or more computer readable memories 1116, such as random access memory ("RAM") and/or other volatile non-transitory computer-readable media. The computer readable memory 1116 may include computer program instructions that the computer processor 1100 executes in order to implement one or more embodiments. For example, the computer readable memory 1116 can store an operating system 1120 that provides computer program instructions for use by the computer processor 1110 in the general administration and operation of the target network device 1100. The computer readable memory 1116 may also include application instructions 1122, 1124 for various applications executed by the target network device 1100.

In some embodiments, as shown, the cybersecurity assessment system computing device 1150 may include: one or more computer processors 1160, one or more network interfaces 1162, one or more computer readable medium drives 1164, and one or more computer readable memories 1166. The computer readable memory 1166 may include computer program instructions that the computer processor 1160 executes in order to implement one or more embodiments. For example, the computer readable memory 1166 can store an operating system 1170 that provides computer program instructions for use by the computer processor 1160 in the general administration and operation of the cybersecurity assessment system 120. The computer readable memory 1166 may also include aggregation instructions 1172 for implementing the aggregation unit 130. The computer readable memory 1160 may also include cybersecurity analysis instructions 1174 for implementing the cybersecurity unit 140. The computer readable memory 1160 may also include transform instructions 1176 for implementing the transform unit 150. The computer readable memory 1160 may also include user interface instructions 1178 for implementing the user interface unit 160.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computing processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising computer-readable memory and one or more hardware processors, wherein the system is configured to at least:
   generate a vulnerability data file by scanning a target network and identifying a plurality of cybersecurity vulnerabilities, wherein each vulnerability is represented in the vulnerability data file by at least a vulnerability identifier and a severity label;
   generate a plurality of severity files, wherein each severity file of the plurality of severity files is associated with a different severity label and comprises a plurality of vulnerability identifiers associated with a respective severity label;
   determine a set of unique vulnerability identifiers in the vulnerability data file;
   generate a map file comprising the set of unique vulnerability identifiers, wherein each unique vulnerability identifier is associated with a key-value pair, and wherein the map file; and
   generate a user interface configured to display a first graph based at least partly on the map file and a selected severity label, wherein the first graph comprises selectable segments for each of the set of unique vulnerability identifiers associated with the selected severity label.

2. The system of claim 1, wherein the system is further configured to, in response to receiving selection of the selected severity label, determine a first dimension measurement of a first selectable segment of the first graph based at least partly on a quantity of vulnerabilities in a corresponding group of vulnerabilities.

3. The system of claim 2, wherein the system is further configured to, in response to receiving selection of the selected severity label, determine a second dimension measurement of the first selectable segment based at least partly on a quantity of devices associated with the corresponding group of vulnerabilities.

4. The system of claim 3, wherein at least one of the first dimension measurement or the second dimension measurement comprises at least one of: a circumferential distance, or a radial distance.

5. The system of claim 1, further configured to generate a summary file comprising data representing a first quantity of vulnerabilities in the vulnerability data file associated with a critical severity label, a second quantity of vulnerabilities in the vulnerability data file associated with a high severity label, and a third quantity of vulnerabilities in the vulnerability data file associated with a medium severity label.

6. The system of claim 5, further configured to generate a second user interface configured to display a second graph based at least partly on the summary file, wherein the second graph comprises selectable segments for each of the plurality of severity files.

7. The system of claim 6, wherein the user interface is generated in response to selection of a selectable segment of the second graph.

8. The system of claim 1, wherein the system is further configured to, in response to receiving selection of the selected severity label, determine a first dimension measurement of a first selectable segment of the first graph based at least partly on a quantity of devices associated with a corresponding group of vulnerabilities.

9. The system of claim 1, wherein a severity label comprises one of: a critical severity label, a high severity label, or a medium severity label.

10. The system of claim 1, wherein the user interface further displays vulnerability details, from the map file, associated with a selected vulnerability.

11. The system of claim 1, further configured to generate a first key-value pair associated with a first vulnerability, wherein a key of the first key-value pair comprises a first vulnerability identifier, and wherein a value of the first key-value pair comprises at least one of: a vulnerability name, a vulnerability synopsis, a vulnerability description, or a vulnerability remediation.

12. A non-transitory computer-readable storage medium storing computer-executable instructions, wherein the computer-executable instructions configure a computing system to at least:
    identify a cybersecurity assessment framework against which a target network is to be assessed;
    determine an initial score for one or more cybersecurity factors associated with the cybersecurity assessment framework;
    generate scan data comprising a plurality of data streams based at least partly on scanning the target network;
    determine an adjustment for one or more of the determined initial scores based at least partly on the scan data, wherein a first adjustment to a first initial score is determined by applying a set of rules, associated with a first cybersecurity factor, to a subset of the scan data;
    generate an overall cybersecurity score based at least partly on applying the determined adjustments to the determined initial scores; and
    present a visual representation of the overall cybersecurity score.

13. The non-transitory computer-readable storage medium of claim 12, wherein the computer-executable instructions further configure the computing system to at least generate a cybersecurity portal interface comprising a plurality of options, wherein a first option of the plurality of options corresponds to the overall cybersecurity score.

14. The non-transitory computer-readable storage medium of claim 13, wherein the computer-executable instructions further configure the computing system to at least generate a cybersecurity status interface comprising a visual representation of a change to the overall cybersecurity score over time.

15. The non-transitory computer-readable storage medium of claim 14, wherein the cybersecurity status interface further comprising a representation of a degree to which each cybersecurity factor associated with the cybersecurity assessment framework has been determined to be satisfied.

16. The non-transitory computer-readable storage medium of claim 12, wherein a first data stream of the plurality of data streams comprises data representing characteristics of devices on the target network, wherein a second data stream of the plurality of data streams comprises data representing events detected on the target network, and wherein a third data stream of the plurality of data streams comprises data representing vulnerabilities associated with devices on the target network.

17. The non-transitory computer-readable storage medium of claim 16, wherein the computer-executable instructions further configure the computing system to:
    generate processed scan data based at least partly on the plurality of data streams;
    generate vulnerability data based on the processed scan data, wherein the vulnerability data comprises data regarding a plurality of vulnerabilities, and wherein each vulnerability of the plurality of vulnerabilities is associated with a severity level of a severity hierarchy; and
    present a first selectable element visually representing a first quantity of vulnerabilities associated with a first severity level, and a second selectable element visually representing a second quantity of vulnerabilities associated with a second severity level.

18. The non-transitory computer-readable storage medium of claim 12, wherein the computer-executable instructions further configure the computing system to at least assess target networks against any of a plurality of cybersecurity assessment frameworks, wherein a first cybersecurity framework of the plurality of cybersecurity assessment frameworks is associated with a different set of cybersecurity factors than a second cybersecurity framework of the plurality of cybersecurity assessment frameworks.

19. The non-transitory computer-readable storage medium of claim 12, wherein the set of rules associated with the first cybersecurity factor specify a satisfaction adjustment to be applied if the subset of the scan data indicates the first cybersecurity factor is satisfied, and a failure adjustment to be applied if the subset of the scan data indicates the first cybersecurity factor is not satisfied.

20. The non-transitory computer-readable storage medium of claim 12, wherein the computer-executable instructions further configure the computing system to at least:

identify a first event using the plurality of data streams;
    determine that one or more characteristics of the first event satisfy an event detection rule;
    present a visual representation of the first event;
    identify a second event using the plurality of data streams;
    determine that one or more characteristics of the second event fail to satisfy the event detection rule; and
    determine not to present a visual representation of the second event.

\* \* \* \* \*